United States Patent [19]

Johnson

[11] 4,386,580

[45] Jun. 7, 1983

[54] ANIMAL LITTER AND METHOD FOR DEODORIZING ANIMAL WASTE WITH DRIED CITRUS PULP

[75] Inventor: Robert M. Johnson, Weston, Conn.

[73] Assignee: Green Mountain Products, Inc., Norwalk, Conn.

[21] Appl. No.: 376,584

[22] Filed: May 10, 1982

[51] Int. Cl.³ .............................................. A01K 1/015
[52] U.S. Cl. ....................................................... 119/1
[58] Field of Search ................................ 119/1; 424/76

[56] References Cited

U.S. PATENT DOCUMENTS

| | | | |
|---|---|---|---|
| 1,967,333 | 7/1934 | Smith et al. | 119/1 |
| 2,179,591 | 11/1939 | Godchaux | 119/1 |
| 2,597,457 | 5/1952 | Cook | 119/1 |
| 2,708,418 | 5/1955 | Sugarman et al. | 119/1 |
| 3,122,127 | 2/1964 | Shechmeister et al. | 119/18 |
| 3,816,577 | 6/1974 | Neckermann | 119/1 |
| 3,821,346 | 6/1974 | Batley, Jr. | 119/1 |
| 4,271,787 | 6/1981 | Wellman | 119/1 |
| 4,308,825 | 1/1982 | Stepanian | 119/1 |

OTHER PUBLICATIONS

Dr. Robert H. Harms and Dr. C. B. Ammerman, "Feeding Value of Poultry Litter Containing Citrus Pulp for Rumminants," Feedstuffs, 9-7-68, pp. 21, 22.

*Primary Examiner*—Hugh R. Chamblee
*Attorney, Agent, or Firm*—Barry R. Lipsitz

[57] ABSTRACT

A method is provided for deodorizing and absorbing the excreta from animals, and particularly from pet animals. The method utilizes dried citrus pulp or sugar beet pulp which both coats the animal feces and absorbs urine. The residual acids and sugars left in the dried pulp serve to neutralize the odor of the excreta.

11 Claims, No Drawings

ANIMAL LITTER AND METHOD FOR DEODORIZING ANIMAL WASTE WITH DRIED CITRUS PULP

BACKGROUND OF THE INVENTION

The present invention relates to a method for deodorizing animal wastes, and more particularly the excreta from pets, such as cats. A novel litter material is used in conjunction with the present method, the litter being made from dried citrus pulp or dried sugar beet pulp.

Animal pets are extremely popular in present day homes, resulting in a need for dealing with animal wastes. Such wastes must be dealt with in a hygienic manner, and preferably in a manner which will also prevent the spread of obnoxious odors throughout the household.

In the past, deodorizer material for pet animals has consisted of inert absorbent particulate material for absorbing animal waste, particularly urine, optionally with odor masking agents and the like. Among such materials which have been used are vermiculite, saw dust, kaolin, ground wood pulp and the like. Other materials, such as molasses serum, as disclosed in U.S. Pat. No. 3,821,346 and cherry pits, disclosed in U.S. Pat. No. 3,816,577, have also been used for pet litters. Further, U.S. Pat. No. 2,179,591 discloses the use of sugar cane pulp as a poultry litter and animal bedding material. U.S. Pat. No. 2,597,457 discloses the use of straw, wood fibers, or peat moss for use as a poultry litter material.

Other attempts to solve the problem of animal waste disposal have utilized cages having an absorbent liner with an odor masking material therein. Such deodorizing materials function effectively for relatively short periods of time, however they require frequent changing in color to prevent objectionable odors from the animal cages. Such devices can also be rather expensive, particularly where absorbent mats and the like are concerned, which detracts from their acceptance in the marketplace.

Numerous efforts have been made in the art toward discovering more efficient alternatives to the known deodorizing materials. In view of the intended use of such materials for pets and the like, the art has long recognized that any such materials must be produced from relatively cheap starting materials in order that the products can be marketed at a cost consistent with those presently utilized.

It would therefore be advantageous to have an inexpensive process for deodorizing animal excreta, and in particular to have a process which is adapted for use by cats and like animals. Such a system should be capable of dealing with both feces and urine, and should utilize readily available materials. It would be a further advantage if the litter material used with such a process would easily coat an animal's feces and absorb the animal's urine.

The present invention relates to such a process.

SUMMARY OF THE INVENTION

In accordance with the present invention, a method is provided for deodorizing animal waste wherein the waste is deposited in contact with dried citrus pulp. The dried citrus pulp is obtainable by squeezing raw citrus fruit to remove the juice therefrom, cutting the squeezed citrus fruit into small pieces of citrus pulp, drying the citrus pulp, and chopping the dried pulp into bits.

In an alternate embodiment, dried sugar beet pulp can be used instead of the dried citrus pulp.

The dried citrus pulp bits or sugar beet bits are of a size which will coat and adhere to animal feces. Further, the dried bits will serve to absorb an animal's urine.

DETAILED DESCRIPTION OF THE INVENTION

The present invention provides a method for deodorizing animal waste wherein the waste is deposited in contact with dried citrus pulp. Citrus pulp comprises the skin, the cells adhered to the interior of the skin, the seeds, and the stems of citrus fruit such as oranges, grapefruits, and lemons. In any given quantity of citrus pulp, it is not unusual that a small amount of extraneous matter will be mixed therewithin. For purposes of the present invention, citrus pulp can be considered to be whatever material is left over after the useable juices, sugars, and liquors have been extracted from citrus fruit.

The citrus pulp used in the present invention is dried after all of the useable materials (e.g. juice, sugars, liquors) have been removed from the fruit. The pulp may be dried in a large tumbler drier, similar to a conventional clothes dryer but on a much larger scale. For example, a dryer used to dry citrus pulp may be fired by gas or oil, which heats air that is blown into a drum on the order of 60 feet long by 20 feet in diameter. The citrus pulp is tumbled within the drum, with the hot air blowing over the pulp. Such dried citrus pulp has a deodorizing quality and because it is dry, will readily absorb liquids brought into contact therewith.

It has been found that when such dried citrus pulp is placed into contact with animal excreta, the dried pulp absorbs moisture from the excreta, adheres to animal feces, and deodorizes both urine and feces.

The ability of the dried citrus pulp to adhere to the animal feces is particularly important, in that the feces can be completely coated with the dried citrus pulp thereby deodorizing the feces in an efficient manner. This aspect is of particular importance when the method of the present invention is used to deodorize the excreta from cats. Cats are known to dig in a litter material, after they have excreted, to cover up the excrement. When dried citrus pulp is used as a litter for cats, the deodorizing ability thereof is enhanced due to the adherence of the dried pulp to the excrement.

Dried citrus pulp for use in connection with the present method can be prepared by first washing citrus fruits, and then squeezing the fruit in a conventional squeezing machine. The juice extracted from the fruit in the squeezing process can be used for human consumption in a variety of products. Usable oils are also extracted from the fruits during the squeezing process. In a preferred embodiment, lime or dolomitic limestone is then added to the squeezed citrus fruit. The purpose of the lime or dolomitic limestone is to remove the soft, moist, slippery coating which would otherwise remain on the squeezed fruit as a result of the squeezing process. Thus, the lime or dolomitic limestone serves to facilitate the further processing of the squeezed fruit by automated machinery.

The squeezed fruit is then cut into small pieces of citrus pulp. The cutting can be accomplished in a conventional hammer mill. It is noted that the cutting step could occur before the squeezing step, however it is more economical to perform the squeezing step first.

The fruit can then be pressed a second time to extract additioanl sugars and liquors which are of value in other products, for example to manufacture a citrus molasses. The citrus pulp is then dried by any conventional means, e.g. a tumbler dryer as described above, and separated from extraneous granular particles and powder which typically are co-mingled with the dried citrus pulp. These granular particles and powders are known in the trade as "fines".

After the citrus pulp has been dried and separated from the fines, it is chopped into smaller pieces, or "bits" for use as a litter material. The chopping may be done in any conventional manner, for example by use of a conventional grinding or chipping machine. The size of the chopped bits is important in determining the suitability of the dried citrus pulp as a litter material. The size of the bits must be such as to allow the bits to adhere to an animal's feces in order to coat the feces. The dried citrus pulp bits are not pliable and therefore if they are too large in size, they will not be capable of sufficiently coating the animal's feces. On the other side of the scale, the dried citrus pulp bits must not be so small that they will be in powder form, such that they could become airborne. The bits must be large enough that they are digable by the animal using them, e.g. a cat.

In satisfying the above-mentioned criteria, it has been found that the citrus pulp bits should be somewhere in the range of from approximately ⅛ inch to ⅜ inch on each side thereof. The optimal size would be somewhere around ¼ inch square.

In an alternate embodiment of the present invention, dried sugar beet pulp can be used instead of the dried citrus pulp described above. The dried sugar beet bits can be manufactured in a manner similar to that used to manufacture the dried citrus pulp bits.

The use of the dried citrus pulp or dried sugar beet pulp, as set forth herein, has been found to be an extremely effective method for absorbing and deodorizing pet wastes. The pulp can be placed in a box so that a pet, such as a cat, can be trained to return thereto whenever it has to urinate and/or defecate. The pulp can also be prepackaged in boxes or trays for sale to a pet owner, said boxes or trays being suitable for use by the pet immediately upon opening.

The present method is useful for deodorizing the waste of many different animals, including cats, dogs, hamsters, gerbils, rats and other like domesticated pets or animals. Likewise, the deodorizer is suitable for domesticated birds or other pets such as reptiles. Of course, the invention is also useful in zoos and other applications. Thus, the description contained herein is considered in all respects to be illustrative and not restrictive, the scope of the invention being indicated by the appended claims rather than by the foregoing description.

I claim:

1. A method for deodorizing animal waste comprising the step of depositing said waste into contact with dried citrus pulp wherein said dried citrus pulp is obtainable by:
    (a) squeezing raw citrus fruit to remove the juice therefrom;
    (b) cutting said squeezed citrus fruit into small pieces of citrus pulp;
    (c) drying said citrus pulp; and
    (d) chopping the dried citrus pulp into bits to obtain a desired size for adhering to animal waste.

2. The method of claim 1 wherein said bits are within the range of about ⅛ inch to ⅜ inch in both length and width.

3. A process for preparing a pet litter comprising:
    squeezing citrus fruit to remove the juice therefrom;
    cutting said squeezed citrus fruit into small pieces of citrus pulp;
    drying said citrus pulp; and
    chopping the dried pulp into bits of a size for adhering to animal waste for use as a litter material.

4. The process of claim 3 comprising the additional step of further squeezing said small pieces of citrus pulp to remove additional sugars and liquors therefrom before said drying step.

5. The process of claim 3 further comprising the step of adding lime or dolomitic limestone to said squeezed citrus fruit before it is cut, said lime or dolomitic limestone serving to facilitate the further processing of said fruit during said cutting step.

6. The process of claim 3 wherein said fruit is grapefruit.

7. The process of claim 3 wherein said fruit comprises oranges.

8. The process of claim 3 wherein said bits are within the range of about ⅛ inch to ⅜ inch in both length and width.

9. Animal litter for deodorizing animal waste comprising dried citrus pulp obtained by:
    (a) squeezing raw citrus fruit to remove the juice therefrom.
    (b) cutting said squeezed citrus fruit into small pieces of citrus pulp;
    (c) drying said citrus pulp; and
    (d) chopping the dried citrus pulp into bits to obtain a desired size for adhering to animal waste.

10. The animal litter of claim 9 wherein said bits are within the range of about ⅛ inch to ⅜ inch in both length and width.

11. The animal litter of claim 9 wherein said small pieces of citrus pulp are further squeezed before said drying step to remove additional sugars and liquors therefrom.

* * * * *